US008886986B2

(12) United States Patent
Xu et al.

(10) Patent No.: US 8,886,986 B2
(45) Date of Patent: Nov. 11, 2014

(54) CLOCK SYNCHRONIZATION METHOD, CUSTOMER PREMISES EQUIPMENT AND CLOCK SYNCHRONIZATION SYSTEM

(75) Inventors: Guijin Xu, Shenzhen (CN); Ruzhou Feng, Shenzhen (CN); Guozhu Long, Santa Clara, CA (US); Jianhua Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 231 days.

(21) Appl. No.: 13/587,646

(22) Filed: Aug. 16, 2012

(65) Prior Publication Data

US 2012/0311653 A1 Dec. 6, 2012

Related U.S. Application Data

(63) Continuation of application No. PCT/CN2011/074071, filed on May 16, 2011.

(30) Foreign Application Priority Data

May 14, 2010 (CN) .......................... 2010 1 0179366

(51) Int. Cl.
| G06F 1/12 | (2006.01) |
| H04L 5/14 | (2006.01) |
| H04J 1/00 | (2006.01) |
| H04J 3/08 | (2006.01) |
| H04J 3/06 | (2006.01) |
| H04M 11/06 | (2006.01) |

(52) U.S. Cl.
CPC ............ H04J 3/0638 (2013.01); H04M 11/062 (2013.01)
USPC ........... 713/400; 370/295; 370/480; 370/503; 375/355

(58) Field of Classification Search
USPC ............ 713/400; 370/295, 480, 503; 375/355
See application file for complete search history.

(56) References Cited

U.S. PATENT DOCUMENTS 7,151,945 B2 * 12/2006 Myles et al. .................. 455/502
(Continued)

FOREIGN PATENT DOCUMENTS

CN 101459502 A 6/2009
(Continued)

OTHER PUBLICATIONS

International Search Report issued in corresponding PCT Application No. PCT/CN2011/074071; mailed Aug. 25, 2011.
(Continued)

Primary Examiner — Stefan Stoynov
(74) Attorney, Agent, or Firm — Brinks Gilson & Lione

(57) ABSTRACT

A clock synchronization method, customer premises equipment and a clock synchronization system are provided. The customer premises equipment reads a first time stamp when receiving a first specific position of a first DMT signal sent by central office equipment; reads a second time stamp when sending a second specific position of a second DMT signal; receives a third time stamp and a fourth time stamp that are sent by the central office equipment through a data information channel. The third time stamp is read when the central office equipment sends the first specific position of the first DMT signal, and the fourth time stamp is read when the central office equipment receives the second specific position of the second DMT signal. The customer premises equipment adjusts a clock of the customer premises equipment according to the first, second, third and fourth time stamps.

14 Claims, 10 Drawing Sheets

(56) References Cited

U.S. PATENT DOCUMENTS

| | | | |
|---|---|---|---|
| 7,577,169 | B1 | 8/2009 | Dinh |
| 7,876,791 | B2 * | 1/2011 | Jung et al. .................. 370/503 |
| 8,670,439 | B2 * | 3/2014 | Wei et al. .................... 370/350 |
| 2010/0020909 | A1 | 1/2010 | Jung |
| 2010/0115047 | A1 * | 5/2010 | Briscoe et al. ............... 709/208 |
| 2011/0296226 | A1 * | 12/2011 | Sorbara et al. ............... 713/400 |

FOREIGN PATENT DOCUMENTS

| | | |
|---|---|---|
| CN | 101499871 A | 8/2009 |
| CN | 101631013 A | 1/2010 |
| EP | 2312776 A1 | 4/2011 |
| EP | 2387190 A1 | 11/2011 |
| WO | WO 2011/035736 A1 | 3/2011 |

OTHER PUBLICATIONS

"IEEE Standard for Precision Clock Synchronization Protocol for Networked Measurement and Control Systems" IEEE Instrumentation and Measurement Society sponsored by the Technical Committee on Sensor Technology (TC-9), Jul. 24, 2008.

Written Opinion of the International Searching Authority issued in corresponding PCT Patent Application No. PCT/CN2011/074071, mailed Aug. 25, 2011.

Extended European Search Report issued in corresponding European Patent Application No. 11780226.4, mailed Jan. 3, 2013.

Lee, "An Enhanced IEEE 1588 Time Synchronization Algorithm for Asymmetric Communication Link Using Block Burst Transmission" IEEE Communications Letters, vol. 12, No. 9, Sep. 2008.

Office Action issued in corresponding Chinese Patent Application No. 201010179366.1, mailed Apr. 17, 2013, 19 pages.

\* cited by examiner

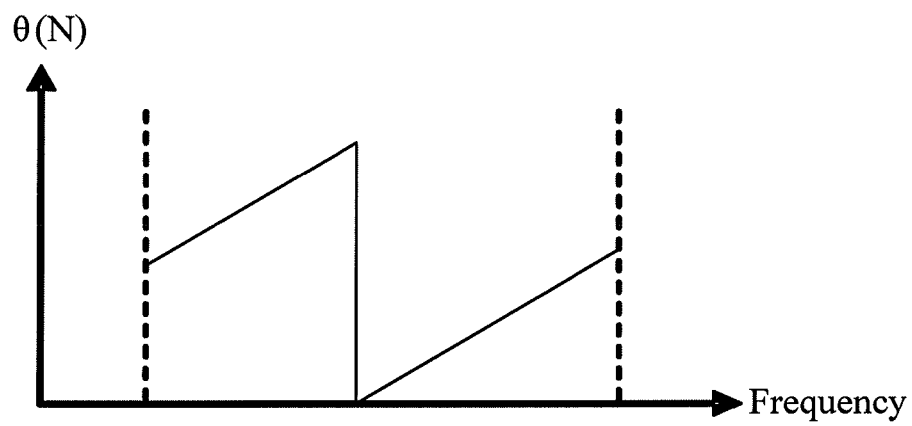
FIG. 4 ( b )
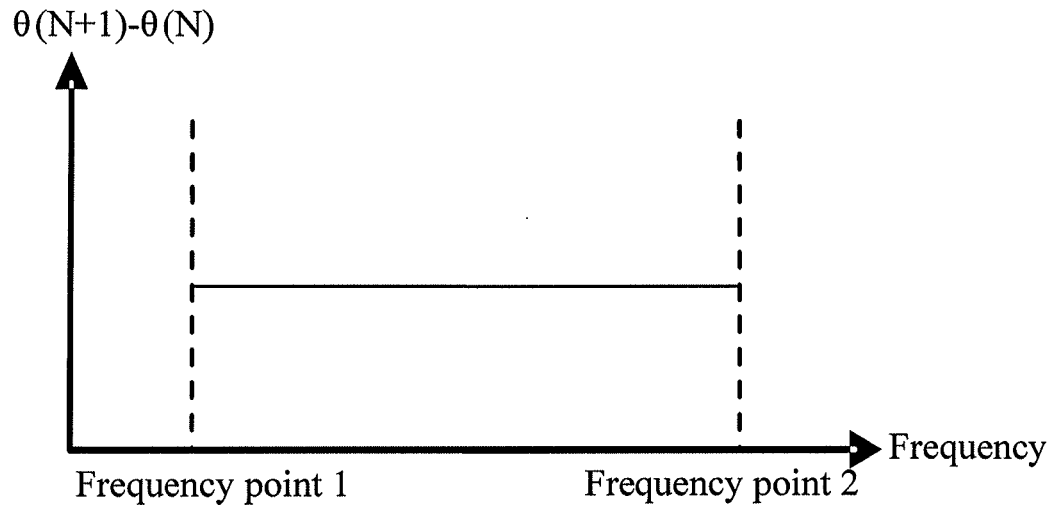
FIG. 4 ( c )

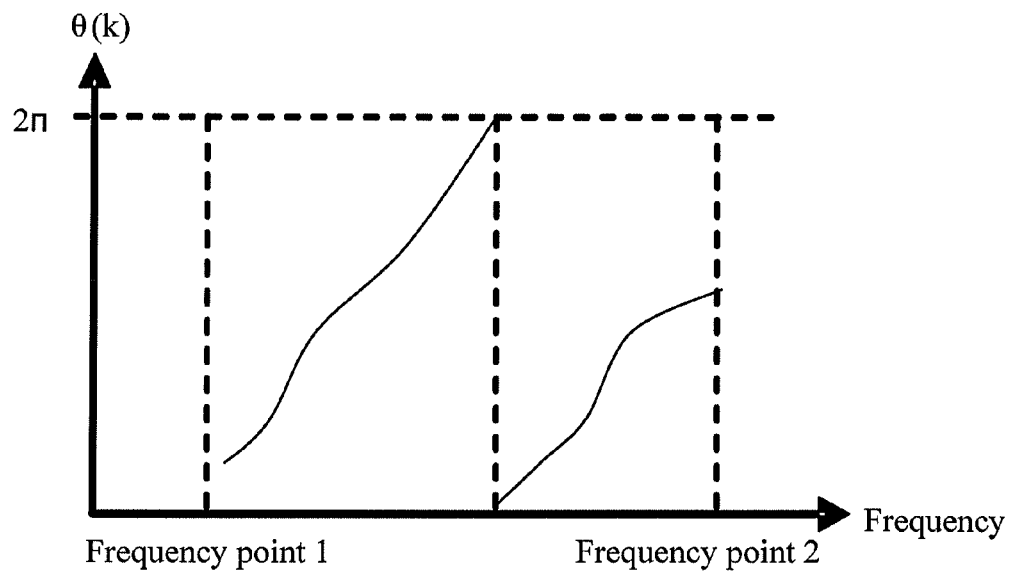
FIG. 6 ( a )
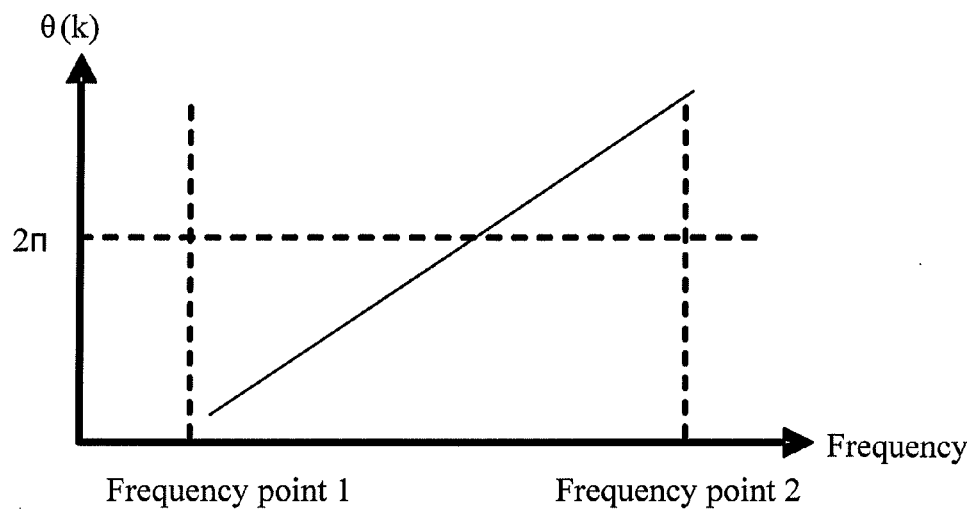
FIG. 6 ( b )

US 8,886,986 B2

CLOCK SYNCHRONIZATION METHOD, CUSTOMER PREMISES EQUIPMENT AND CLOCK SYNCHRONIZATION SYSTEM

CROSS-REFERENCE TO RELATED APPLICATIONS

This application is a continuation of International Application No. PCT/CN2011/074071, filed on May 16, 2011, which claims priority to Chinese Patent Application No. 201010179366.1, filed on May 14, 2010, both of which are hereby incorporated by reference in their entireties.

FIELD

The present disclosure relates to the field of video technologies, and in particular, to a clock synchronization method, customer premises equipment, and a clock synchronization system.

BACKGROUND

With the emergence of 3rd generation (3rd Generation, 3G) mobile communications and more advanced digital mobile technologies, demands for a mini base station increase, and soon the picocell may be used at home as a femtocell. The femtocell has a high requirement that time synchronization is implemented in a low cost, and a mobile service requires that precision of time synchronization reaches a microsecond level.

During signal transmission in an X digital subscriber line (X Digital Subscriber Line, XDSL) system, uninterrupted symbols are transmitted one by one, and no obvious boundary exists between the symbols. Therefore, receiving end equipment is difficult to find a strict synchronization point to mark a moment when the receiving end equipment receives the signal sent by transmitting end equipment, and a moment when the transmitting end equipment receives the signal sent by the receiving end equipment.

In addition, uplink and downlink delays in an XDSL channel are different as a channel between central office (Central Office, CO) equipment and customer premises equipment (Customer Premises Equipment, CPE) is complicated, and the signal in the channel needs to pass through a physical media dependent (Physical Media Dependent, PMD) layer having an analog circuit and also having a digital signal processing circuit, a physical media specific-transmission convergence layer (Physical Media Specific-Transmission Convergence Layer, PMS-TC) with complicated Reed-Solomon (Reed-Solomon, RS) coding/decoding and interleaving/de-interleaving, and a transmission protocol specific-transmission convergence layer (Transmission Protocol Specific-Transmission Convergence Layer, TPS-TC) with complicated protocol processing. Even if time synchronization is performed in the PMD layer, an analog circuit at the central office, a cable, and an analog circuit at the remote end also need to be pass through, and a common digital circuit and a digital signal processing circuit between the central office and the remote end further need to be passed through, so that the downlink delay from the central office to the remote end is not necessarily equal to the uplink delay from the remote end to the central office. In the prior art, in the XDSL link, a difference between the downlink delay and the uplink delay may be much greater than 1 μs, and at this time, a time error after recovering in the prior art may be much greater than 1 μs.

However, no synchronization method in the prior art can meet the high-precision requirement of the XDSL system on the clock synchronization.

SUMMARY

Embodiments of the present disclosure provide a clock synchronization method, customer premises equipment and a clock synchronization system, so as to improve the precision of clock synchronization and meet the high-precision requirement of an XDSL system on the clock synchronization.

An embodiment of the present disclosure provides a clock synchronization method, where the method includes: reading, by customer premises equipment, a first time stamp when receiving a first specific position of a first discrete multi-tone (Discrete Multi-Tone, DMT) signal sent by central office equipment; and reading a second time stamp when sending a second specific position of a second DMT signal; receiving, by the customer premises equipment, a third time stamp and a fourth time stamp that are sent by the central office equipment through a data information channel, where the third time stamp is read when the central office equipment sends the first specific position of the first DMT signal, and the fourth time stamp is read when the central office equipment receives the second specific position of the second DMT signal; and determining, by the customer premises equipment, a clock offset between the customer premises equipment and the central office equipment according to the first time stamp, the second time stamp, the third time stamp and the fourth time stamp; and adjusting a clock of the customer premises equipment according to the clock offset, so that the clock of the customer premises equipment is synchronized with a clock of the central office equipment.

An embodiment of the present disclosure further provides a customer premises equipment, where the equipment includes: a receiving circuit module, configured to receive a first discrete multi-tone (DMT) signal sent by central office equipment; a reading module, configured to read a first time stamp when the receiving circuit module receives a first specific position of the first DMT signal; a sending circuit module, configured to send a second DMT signal, where the reading module is further configured to read a second time stamp when the sending circuit module sends a second specific position of the second DMT signal; a time stamp receiving module, configured to receive a third time stamp and a fourth time stamp that are sent by the central office equipment through a data information channel, where the third time stamp is read when the central office equipment sends the first specific position of the first DMT signal, and the fourth time stamp is read when the central office equipment receives the second specific position of the second DMT signal; and an adjusting module, configured to determine a clock offset between the customer premises equipment and the central office equipment according to the first time stamp, the second time stamp, the third time stamp and the fourth time stamp, and adjust a clock of the customer premises equipment according to the clock offset, so that the clock of the customer premises equipment is synchronized with a clock of the central office equipment.

An embodiment of the present disclosure further provides a clock synchronization system, where the system includes: customer premises equipment and central office equipment.

The customer premises equipment is configured to read a first time stamp when receiving a first specific position of a first discrete multi-tone (DMT) signal sent by the central office equipment; read a second time stamp when sending a second specific position of a second DMT signal; receive a third time stamp and a fourth time stamp that are sent by the central office equipment through a data information channel; determine a clock offset between the customer premises equipment and the central office equipment according to the first time stamp, the second time stamp, the third time stamp and the fourth time stamp, and adjust a clock of the customer premises equipment according to the clock offset, so that the clock of the customer premises equipment is synchronized with a clock of the central office equipment.

The third time stamp is read when the central office equipment sends the first specific position of the first DMT signal, and the fourth time stamp is read when the central office equipment receives the second specific position of the second DMT signal.

In the embodiments of the present disclosure, the customer premises equipment reads the first time stamp when receiving the first specific position of the first DMT signal sent by the central office equipment; and reads the second time stamp when sending the second specific position of the second DMT signal. In addition, the customer premises equipment may receive the third time stamp and the fourth time stamp that are sent by the central office equipment through the data information channel, where the third time stamp is read when the central office equipment sends the first specific position of the first DMT signal, and the fourth time stamp is read when the central office equipment receives the second specific position of the second DMT signal. Finally, the customer premises equipment may determine the clock offset between the customer premises equipment and the central office equipment according to the first time stamp, the second time stamp, the third time stamp and the fourth time stamp, and adjust the clock of the customer premises equipment according to the clock offset, so that the clock of the customer premises equipment is synchronized with the clock of the central office equipment. The embodiments of the present disclosure improve the precision of clock synchronization and meet the high-precision requirement of the XDSL system on the clock synchronization.

BRIEF DESCRIPTION OF THE DRAWINGS

To illustrate the solutions according to the embodiments of the present disclosure or in the prior art more clearly, the accompanying drawings for describing the embodiments or the prior art are introduced briefly in the following. Apparently, the accompanying drawings in the following description are some embodiments of the present disclosure, and persons skilled in the art may derive other drawings from the accompanying drawings without creative efforts.

DETAILED DESCRIPTION OF THE EMBODIMENTS

In order to make the objectives, solutions, and advantages of the present disclosure more comprehensible, the solutions of the present disclosure are clearly and completely described in the following with reference to the accompanying drawings. It is obvious that the embodiments to be described are a part rather than all of the embodiments of the present disclosure. All other embodiments obtained by persons skilled in the art based on the embodiments of the present disclosure without creative efforts shall fall within the protection scope of the present disclosure.

Figure 1:
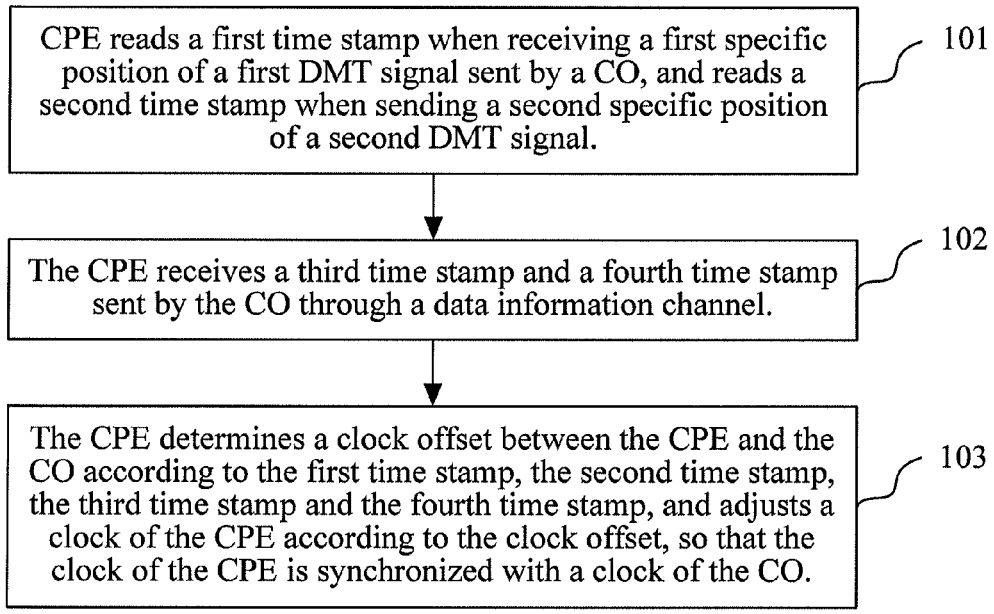
FIG. 1 is a flow chart of an embodiment of a clock synchronization method according to the present disclosure.

FIG. 1 is a flow chart of an embodiment of a clock synchronization method according to the present disclosure, and as shown in FIG. 1, the clock synchronization method may include the following steps:

Step 101: A CPE reads a first time stamp when receiving a first specific position of a first DMT signal sent by a CO, and reads a second time stamp when sending a second specific position of a second DMT signal.

Specifically, the CPE may read a first clock counter of the CPE when receiving the first specific position of the first DMT signal and obtain the first time stamp; and the CPE may read the first clock counter when sending the second specific position of the second DMT signal and obtain the second time stamp.

The first specific position may be an initial position of the first DMT signal or any designated position of the first DMT signal; and the second specific position may be an initial position of the second DMT signal or any designated position of the second DMT signal, which are not limited in the embodiment of the present disclosure.

Step 102: The CPE receives a third time stamp and a fourth time stamp that are sent by the CO through a data information channel, where the third time stamp is read when the CO sends the first specific position of the first DMT signal, and the fourth time stamp is read when the CO receives the second specific position of the second DMT signal.

Specifically, the third time stamp is obtained through reading a second clock counter of the CO when the CO sends the first specific position of the first DMT signal; and the fourth time stamp is obtained through reading the second clock counter when the CO receives the second specific position of the second DMT signal.

In this embodiment, counting clocks of the first clock counter and the second clock counter are synchronized with a network reference clock. The second clock counter is updated at a fixed time by the CO according to a network time reference signal of the network reference clock.

Specifically, the network time reference signal is a serial signal. The second clock counter may be updated at a fixed time by the CO according to time information in a parallel signal, where the parallel signal is converted from the serial signal and includes the time information and a pulse per second signal corresponding to the time information.

Step 103: The CPE determines a clock offset between the CPE and the CO according to the first time stamp, the second time stamp, the third time stamp and the fourth time stamp, and adjusts a clock of the CPE according to the clock offset, so that the clock of the CPE is synchronized with a clock of the CO.

Specifically, the CPE may calculate a first clock offset between the CPE and the CO according to the first time stamp, the second time stamp, the third time stamp and the fourth time stamp, and adjust a counting clock of the second clock counter of the CPE according to the first clock offset, so that the clock of the CPE is synchronized with the clock of the CO; or, the CPE may send the first time stamp and the second time stamp to the CO through the data information channel, receive a first clock offset that is between the CPE and the CO and is sent by the CO through a message channel, and adjust a counting clock of the second clock counter of the CPE according to the first clock offset, so that the clock of the CPE is synchronized with the clock of the CO, where the first clock offset is calculated by the CO according to the first time stamp, the second time stamp, the third time stamp and the fourth time stamp.

In an implementation manner of this embodiment, after reading the first time stamp, the CPE may further correct the first time stamp by eliminating a first symbol synchronization offset, a first analog receiving circuit delay of the CPE and a first digital receiving circuit delay of the CPE from the first time stamp, and obtain a corrected first time stamp. After reading the second time stamp, the CPE may further correct the second time stamp by eliminating a second analog sending circuit delay and a second digital sending circuit delay of the CPE from the second time stamp, and obtain a corrected second time stamp. In addition, the third time stamp received by the CPE is a corrected third time stamp obtained after the CO corrects the third time stamp by eliminating a first analog sending circuit delay and a first digital sending circuit delay of the CO from the third time stamp that is read when the CO sends the first specific position of the first DMT signal; and the fourth time stamp received by the CPE is a corrected fourth time stamp obtained after the CO corrects the fourth time stamp by eliminating a second symbol synchronization offset, a second analog receiving circuit delay of the CO and a second digital receiving circuit delay of the CO from the fourth time stamp that is read when the CO receives the second specific position of the second DMT signal.

In this implementation manner, the CPE may determine a clock offset between the CPE and the CO according to the corrected first time stamp, the corrected second time stamp, the corrected third time stamp and the corrected fourth time stamp, and adjust the clock of the CPE according to the clock offset.

Specifically, the CPE may calculate a second clock offset between the CPE and the CO according to the corrected first time stamp, the corrected second time stamp, the corrected third time stamp and the corrected fourth time stamp, and adjust the counting clock of the second clock counter of the CPE according to the second clock offset, so that the clock of the CPE is synchronized with the clock of the CO; or, the CPE may send the corrected first time stamp and the corrected second time stamp to the CO through the data information channel, receive a second clock offset that is between the CPE and the CO and is sent by the CO through the message channel, and adjust the counting clock of the second clock counter of the CPE according to the second clock offset, so that the clock of the CPE is synchronized with the clock of the CO, where the second clock offset is calculated by the CO according to the corrected first time stamp, the corrected second time stamp, the corrected third time stamp and the corrected fourth time stamp.

In the above embodiment, the CPE reads the first time stamp when receiving the first specific position of the first DMT signal sent by the CO, and reads the second time stamp when sending the second specific position of the second DMT signal. In addition, the CPE may receive the third time stamp and the fourth time stamp that are sent by the CO through the data information channel, where the third time stamp is read when the CO sends the first specific position of the first DMT signal, and the fourth time stamp is read when the CO receives the second specific position of the second DMT signal. Finally, the CPE may determine the clock offset between the CPE and the CO according to the first time stamp, the second time stamp, the third time stamp and the fourth time stamp, and adjust the clock of the CPE according to the clock offset, so that the clock of the CPE is synchronized with the clock of the CO. This embodiment improves the precision of clock synchronization and meets the high-precision requirement of an XDSL system on the clock synchronization.

The implementation manners of the embodiment of the present disclosure are described in detail in the following through specific examples.

A downlink processing procedure is as follows:

At the CO side, when the first specific position of the first DMT signal starts to be sent, the action of reading a local second clock counter is triggered. The CO reads the second clock counter, obtains a third time stamp $Tm1'$, stores the $Tm1'$, and corrects the $Tm1'$ by eliminating a first analog sending circuit delay $\Delta t2$ and a first digital sending circuit delay $\Delta t1$ of the CO from the $Tm1'$ to obtains a corrected third time stamp $Tm1$, which is shown in equation (1):

$$Tm1 = Tm1' + \Delta t1 + \Delta t2 \quad (1).$$

At the CPE side, when the first specific position of the first DMT signal starts to be received, the action of reading a local first clock counter is triggered. The CPE reads the first clock counter, obtains a first time stamp $Ts1''$, stores the $Ts1''$, corrects the $Ts1''$ by eliminating a first symbol synchronization offset from the $Ts1''$ to obtain $Ts1'$, and corrects the $Ts1'$ by eliminating a first analog receiving circuit delay $\Delta t2'$ and a first digital receiving circuit delay $\Delta t1'$ of the CPE from the $Ts1'$ to obtain a corrected first time stamp $Ts1$, which is shown in equation (2):

$$Ts1 = Ts1' - \Delta t1' - \Delta t2' \quad (2).$$

Equation (1) and equation (2) are substituted into a downlink time offset calculation formula, and then a downlink time offset Offset1 may be obtained, where the downlink time offset calculation formula is shown in equation (3):

$$Offset1 = Ts1 - Tm1 - Delay1 \quad (3).$$

An uplink processing procedure is as follows:

At the CPE side, when the second specific position of the second DMT signal starts to be sent, the action of reading a local first clock counter is triggered. The CPE reads the first clock counter, obtains a second time stamp $Ts2'$, stores the $Ts2'$, and corrects the $Ts2'$ by eliminating a second analog sending circuit delay $\Delta t5'$ and a second digital sending circuit delay $\Delta t4'$ of the CPE from the $Ts2'$ to obtain a corrected second time stamp $Ts2$, which is shown in equation (4):

$$Ts2 = Ts2' + \Delta t4' + \Delta t5' \quad (4).$$

At the CO side, when the second specific position of the second DMT signal starts to be received, the action of reading a local second clock counter is triggered. The CO reads the second clock counter, obtains a fourth time stamp Tm2", stores the Tm2", corrects Tm2" by eliminating a symbol synchronization offset from the Tm2" to obtain Tm2', and corrects the Tm2' by eliminating a second analog receiving circuit delay Δt5 and a second digital receiving circuit delay Δt4 of the CO from the Tm2' to obtain a corrected fourth time stamp, which is shown in equation (5):

$$Tm2 = Tm2' - \Delta t4 - \Delta t5 \qquad (5).$$

Equation (4) and equation (5) are substituted into an uplink time offset calculation formula, and then an uplink time offset Offset2 may be obtained, where the uplink time offset calculation formula is shown in equation (6):

$$\text{Offset2} = Ts2 - Tm2 + \text{Delay2} \qquad (6).$$

If a downlink line delay Δt3 (Δt3=Delay1) is equal to an uplink line delay Δt6 (Δt6=Delay2), a second clock offset Offset between the CPE and the CO may be obtained through equation (3) and equation (6), which is shown in equation (7):

$$\text{Offset} = (\text{Offset1} + \text{Offset2})/2 = ((Ts2 + Ts1) - (Tm2 + Tm1))/2 \qquad (7).$$

Then, the CPE may adjust the clock of the CPE according to a value of the Offset, so that the clock of the CPE is synchronized with the clock of the CO.

Figure 2:
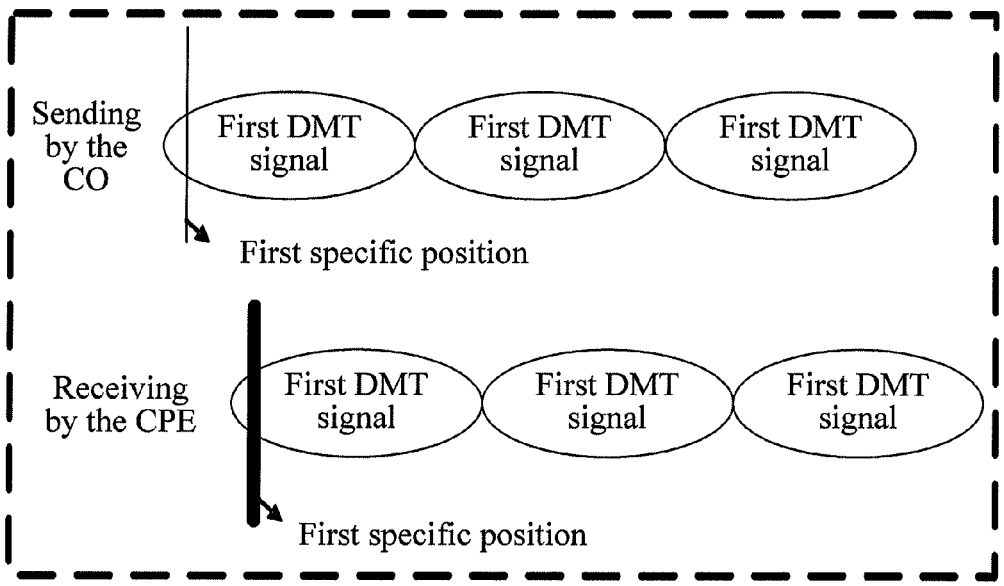
FIG. 2 is a schematic diagram of an embodiment of a first specific position according to the present disclosure.

In this embodiment, the first specific position may be an initial position of the first DMT signal or any designated position of the first DMT signal, as shown in FIG. 2, which is a schematic diagram of an embodiment of the first specific position according to the present disclosure. The second specific position may be an initial position of the second DMT signal or any designated position of the second DMT signal, as shown in FIG. 3, which is a schematic diagram of an embodiment of the second specific position according to the present disclosure.

Figure 3:
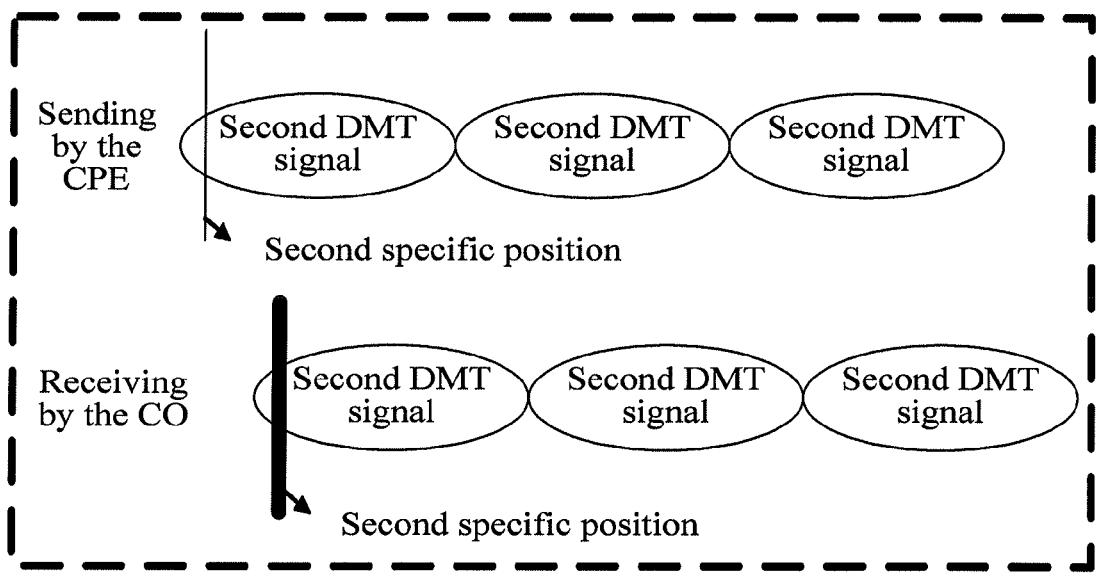
FIG. 3 is a schematic diagram of an embodiment of a second specific position according to the present disclosure.

It should be noted that, FIG. 2 and FIG. 3 illustrate examples of the first specific position and the second specific position respectively, which are not intended to limit the embodiments of the present disclosure.

The XDSL includes an asymmetrical digital subscriber line (Asymmetrical Digital Subscriber Line, ADSL), an ADSL2, an ADSL2 PLUS and a very high speed digital subscriber line 2 (Very High Speed Digital Subscriber Line 2, VDSL2), and the XDSL applies DMT modulation/demodulation technologies to transmit information, where an XDSL signal is formed by a series of DMT signals. A receiver of a digital subscriber line (Digital Subscriber Line, DSL) may identify a boundary of the DMT signal, and implement symbol synchronization. Actually, a symbol synchronization mechanism may have a tiny offset, that is, a symbol synchronization offset, which may be generated by a symbol synchronization algorithm, or may be generated due to a limited sampling frequency of the DSL receiver or due to different transmission delays of signals with different frequencies on the DSL link.

As shown in FIG. 2 and FIG. 3, at the CO side during a downlink processing procedure, when the first specific position of the first DMT signal starts to be sent, the third time stamp Tm1' is recorded. When the first DMT signal is transmitted to the CPE side, as shown in FIG. 2, the first specific position of the first DMT signal indicated through symbol synchronization may have a certain offset. As described in the above, the first time stamp Ts1" recorded when the first specific position of the first DMT signal starts to be received has a certain offset, that is, the first symbol synchronization offset. Likewise, at the CPE side during an uplink processing procedure, when the second specific position of the second DMT signal starts to be sent, the CPE obtains the second time stamp Ts2'. However, referring to FIG. 3, when the CO starts to receive the second specific position of the second DMT signal, the obtained fourth time stamp Tm2" has a certain offset, that is, the second symbol synchronization offset.

Generally, in an ADSL link, the offset of Tm2" is greater than that of Ts1" because an uplink sampling rate is lower than a downlink sampling rate, and moreover, a delay difference of a sub-carrier adjacent to an uplink frequency band is greater than a delay difference of a sub-carrier adjacent to a downlink frequency band.

A method for correcting by eliminating the first symbol synchronization offset and the second symbol synchronization offset according to the embodiment of the present disclosure is described in the following. Because in the embodiment of the present disclosure, the same method for correcting by eliminating the first symbol synchronization offset and the second symbol synchronization offset is used, the first symbol synchronization offset and the second symbol synchronization offset are not differentiated in the method for correcting by eliminating the symbol synchronization offset described in the following.

In the DSL system, due to noise immunity, the fact that the symbol synchronization offset may be greater than periods of several sine signals, and simplification of a design, in the embodiment of the present disclosure, signals with multiple frequencies are used to perform the correction about the symbol synchronization offset. The DSL link includes a digital signal processing circuit, an analog circuit and a line. A phase response of the signals in a certain frequency band has certain linearity, and the signals almost have the same group delay. In the embodiment of the present disclosure, the signals in the frequency band are used for correction about the symbol synchronization offset. A parameter of a frequency domain equalizer (Frequency Domain Equalizer, FEQ) in the DSL system may provide phase information of the symbol synchronization offset, so that the FEQ parameter may be used to calculate a time offset at a symbol initial position when a symbol synchronization distance is sent. The FEQ parameter is existing information in the DSL system, and the existing information may be used to simplify the design. In the embodiment of the present disclosure, the method for correcting by eliminating the symbol synchronization offset by using the FEQ parameter is as described in the following.

First, it is required to obtain FEQ parameter of a DMT signal of a designated frequency band, phase information in the FEQ parameter is extracted, straight-line fitting is then performed on the phase information, and finally, a slope of the straight line is calculated, where an obtained slope represents magnitude of the symbol synchronization offset. If the symbol synchronization offset is 0, it indicates that no symbol synchronization offset exists, and then the slope of the phase information of the FEQ parameter is 0. However, actually, the case that no symbol synchronization offset exists is impossible.

Figure 4:
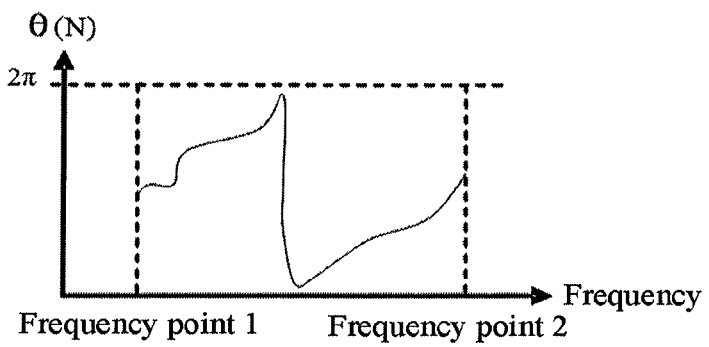
FIG. 4(a) to FIG. 4(d) are schematic diagrams of an embodiment of a method for calculating a symbol synchronization offset according to the present disclosure.
Figure 4:
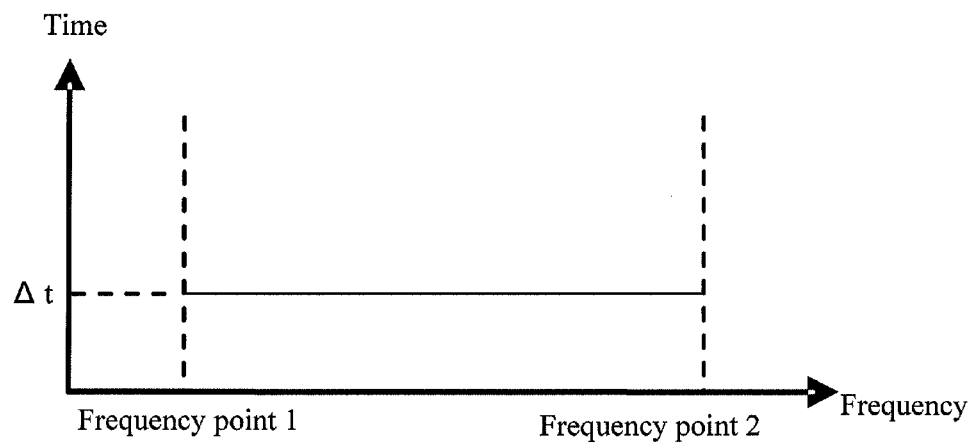

A specific method for calculating the symbol synchronization offset is illustrated with reference to FIG. 4(a) to FIG. 4(d). FIG. 4(a) to FIG. 4(d) are schematic diagrams of an embodiment of a method for calculating the symbol synchronization offset according to the present disclosure, and illustrate a method for correcting the effect on a time stamp of a receiving end due to the symbol synchronization offset through a method of group delay by using the phase information of the FEQ parameter. In FIG. 4(a) to FIG. 4(d), θ(N) is a phase component of the FEQ parameter, and an approximately linear phase response basically exists in a frequency band from a frequency point 1 to a frequency point 2, which is equal to that a substantially equal group delay exists in the frequency band from the frequency point 1 to the frequency point 2. Generally, to ensure such a case, a designated frequency band is a certain distance away from cut-off frequency points of a filter applied in the DSL link. FIG. 4(*a*) illustrates an FEQ phase of a DMT signal in the designated frequency band, FIG. 4(*b*) illustrates a result after performing straight-line fitting on the FEQ phase in FIG. 4(*a*), FIG. 4(*c*) illustrates the obtaining of a slope of the straight line in FIG. 4(*b*) through calculation, and FIG. 4(*d*) illustrates a symbol synchronization offset obtained according to the slope shown in FIG. 4(*c*), where the symbol synchronization offset is indicated in a time unit, and in FIG. 4(*d*), the symbol synchronization offset is $$\Delta t = \frac{\theta(N+1) - \theta(N)}{2\pi \cdot 4.3125K}.$$

On the DSL link, the CO and the CPE both have an analog circuit and a digital circuit, and also include a line. Delays of DSL uplink signals and DSL downlink signals are not necessarily the same when the signals pass through the foregoing constituents, and a difference may be greater than a requirement of a mobile bearer on the time synchronization. In the embodiment of the present disclosure, the delay of the DSL link includes a first analog sending circuit delay $\Delta t2$ and a first digital sending circuit delay $\Delta t1$ of the CO, a first analog receiving circuit delay $\Delta t2'$ and a first digital receiving circuit delay $\Delta t1'$ of the CPE, a second analog sending circuit delay $\Delta t5'$ and a second digital sending circuit delay $\Delta t4'$ of the CPE, a second analog receiving circuit delay $\Delta t5$ and a second digital receiving circuit delay $\Delta t4$ of the CO, and a downlink line delay $\Delta t3$ and an uplink line delay $\Delta t6$.

$\Delta t1$, $\Delta t2$, $\Delta t1'$, $\Delta t2'$, $\Delta t4'$, $\Delta t5'$, $\Delta t4$ and $\Delta t5$ are circuit delays in the equipment and are generally fixed, which may be obtained through testing or calculation.

$\Delta t3$ is a delay of a downlink signal when the a downlink signal passes through the line, and $\Delta t6$ is a delay of an uplink signal when the uplink signal passes through the line, which are both related to a length of the line used by the DSL link, and are unknown. Moreover, as for $\Delta t3$ and $\Delta t6$, a high-precision result cannot be obtained directly through a testing method. In addition, in the DSL link, $\Delta t3$ and $\Delta t6$ have a certain difference due to different delays of the signals in the uplink and downlink frequency bands on a twisted pair. To solve the problem, in the embodiment of the present disclosure, uplink and downlink frequency bands with the frequencies as close as possible to each other are selected, so that $\Delta t3 \approx \Delta t6$.

Specifically, for the downlink signals, a frequency band having approximately the same time delay is selected; and for the uplink signals, a frequency band having approximately the same time delay is also selected, so that the selected two frequency bands are as close as possible to each other, and further $\Delta t3 \approx \Delta t6$.

To further improve the precision, according to a locally used subscriber cable, a delay relation among the signals of the used uplink and downlink frequency bands on the cable may be provided, for example, k×$\Delta t3$=$\Delta t6$, where k may be obtained through pre-testing or calculation. In this way, a second clock offset between the CPE and the CO with a higher precision may be obtained through equations (3), (6) and (8), where equation (8) is shown in the following:

Delay2=*k*×Delay1      (8).

Generally, if the US0 frequency band is not used in the VDSL2 scenario, it may be considered that delays in uplink and downlink full frequency bands are equal to each other, that is, $\Delta t3 \approx \Delta t6$.

In the embodiment of the present disclosure, delays of signals in the XDSL uplink and downlink frequency bands are greatly different from each other in the XDSL analog circuit, a frequency band with approximately the same delay in the XDSL analog circuit may be selected in the downlink frequency band, and $\Delta t2$ and $\Delta t2'$ are obtained through a testing or calculation method. Likewise, a frequency band with approximately the same delay in the XDSL analog circuit may also be selected in the uplink frequency band, and $\Delta t5$ and $\Delta t5'$ are obtained through a testing or calculation method.

In the embodiment of the present disclosure, a pure delay of a digital logic circuit may be obtained through an emulation method in advance. A method for obtaining a delay of a digital signal processing circuit is described in the following.

Figure 5:
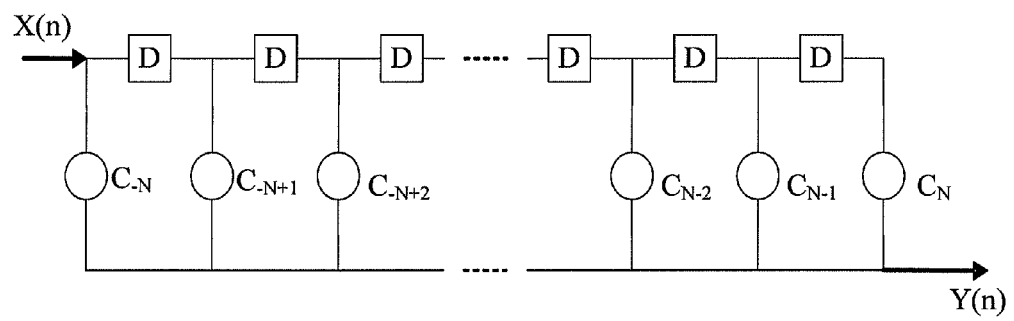
FIG. 5 is a schematic diagram of an embodiment of a finite impulse response (Finite Impulse Response, FIR) filter in a digital processing circuit according to the present disclosure.
Figure 6:
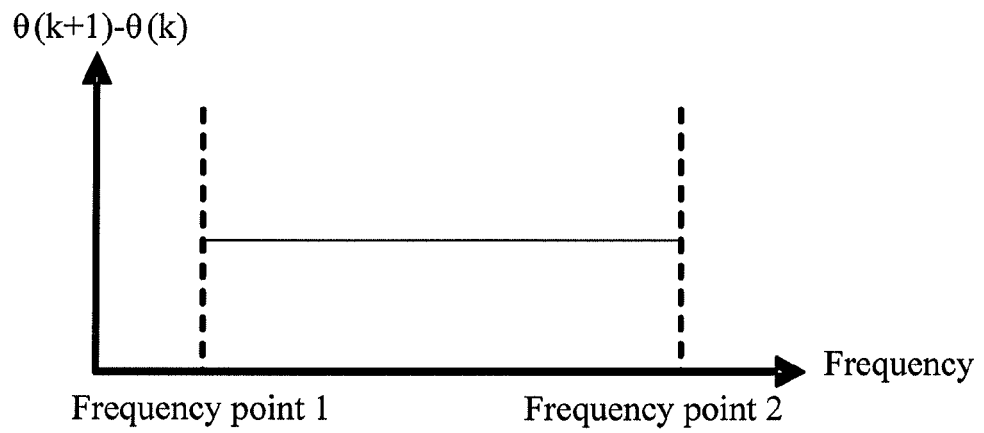
FIG. 6(a) to FIG. 6(d) are schematic diagrams of an embodiment of a method for obtaining a delay of a digital signal processing circuit according to the present disclosure.
Figure 6:
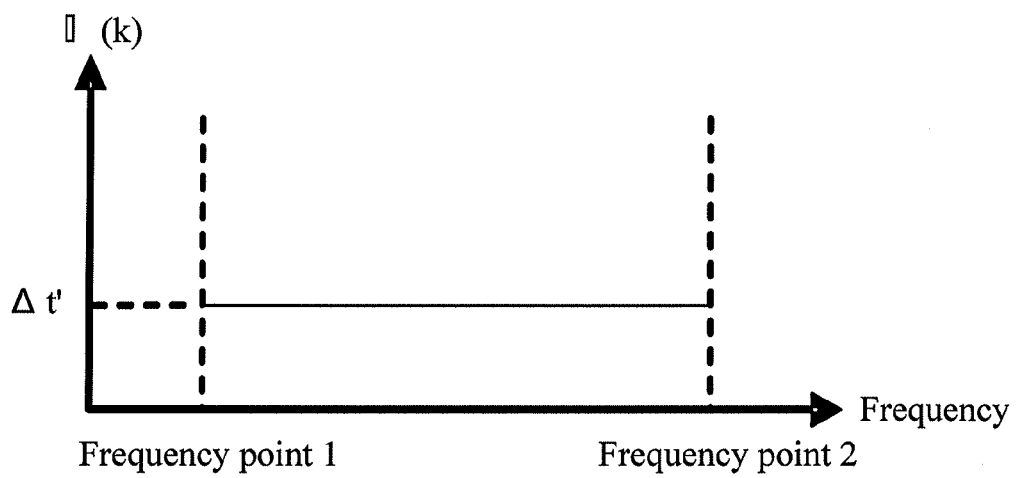

FIG. 5 is a schematic diagram of an embodiment of a finite impulse response (Finite Impulse Response, FIR) filter in a digital processing circuit according to the present disclosure. FIG. 6(*a*) to FIG. 6(*d*) are schematic diagrams of an embodiment of a method for obtaining a delay of a digital signal processing circuit according to the present disclosure.

In the embodiment of the present disclosure, the method illustrated in FIG. 6(*a*) to FIG. 6(*d*) is a method for calculating a delay of the FIR filter shown in FIG. 5. In FIG. 6(*a*) to FIG. 6(*d*), θ(k) is a phase response of a frequency band of the FIR filter, and a frequency band from a frequency point 1 to a frequency point 2 is a frequency band that is selected in the embodiment of the present disclosure and has a good linear phase response. Δ(k) is a group delay obtained according to θ(k), and a calculation method of the group delay is the same as that of the symbol synchronization offset. Specifically, FIG. 6(*a*) illustrates a phase of the designated frequency band, FIG. 6(*b*) illustrates a result after performing straight-line fitting on the phase in FIG. 6(*a*), FIG. 6(*c*) illustrates the obtaining of a slope of the straight line in FIG. 6(*b*) through calculation, and FIG. 6(*d*) illustrates a group delay obtained according to the slope shown in FIG. 6(*c*), where in FIG. 6(*d*), the group delay is $$\Delta t' = \frac{\theta(k+1) - \theta(k)}{2\pi \cdot 4.3125K}.$$

Through the method shown in FIG. 6(*a*) to FIG. 6(*d*), $\Delta t1$ and $\Delta t1'$, $\Delta t4$ and $\Delta t4'$ may be obtained.

In addition, in the calculation of the digital circuit delays $\Delta t1$ and $\Delta t1'$, $\Delta t4$ and $\Delta t4'$, if delays of a sequential logic circuit and/or a combined logic circuit affect the precision of the time stamp, the effect of the delays of the sequential logic circuit and/or the combined logic circuit needs to be taken into consideration in $\Delta t1$ and $\Delta t1'$, $\Delta t4$ and $\Delta t4'$, and the delays of the sequential logic circuit and/or the combined logic circuit may be obtained through an emulation or a calculation method.

In the embodiment of the present disclosure, during the correction about the symbol synchronization offset, the analog circuit delay and the digital circuit delay, it is required to select an approximately linear phase response, that is, a frequency band with approximately the same group delay, so that a frequency band selected during the correction about the symbol synchronization offset, the analog circuit delay and the digital circuit delay has a common frequency band intersection. Seen from testing and emulation results, the selection of a frequency band needs to be considered in the implementation of high-precision clock synchronization on the ADSL link. However, as for a general VDSL frequency band, because delays of different frequencies on the analog circuit and the digital circuit of the whole VDSL frequency band are slightly different from each other, and the delays have little effect on the precision of the clock synchronization, it is basically not required to consider the selection of the frequency band. A method for selecting a frequency band during correction of a time stamp in the ADSL system is mainly described in the following.

As for ADSL Annex A, a frequency band from a sub-carrier 21 to a sub-carrier 30 is selected as a time stamp correction frequency band in an uplink frequency band, to perform the correction about the analog circuit delay, the digital circuit delay and the symbol synchronization offset; and a frequency band from a sub-carrier 36 to a sub-carrier 55 is selected as a time stamp correction frequency band in a downlink frequency band, to perform the correction about the analog circuit delay, the digital circuit delay and the symbol synchronization offset.

As for ADSL Annex M, a frequency band from a sub-carrier 31 to a sub-carrier 50 is selected as a time stamp correction frequency band in an uplink frequency band, to perform the correction about the analog circuit delay, the digital circuit delay and the symbol synchronization offset; and a frequency band from a sub-carrier 91 to a sub-carrier 110 is selected as a time stamp correction frequency band in a downlink frequency band, to perform the correction about the analog circuit delay, the digital circuit delay and the symbol synchronization offset.

As for the VDSL frequency band, generally, it is not required to select a frequency band as a reference frequency band for time stamp correction, and the full frequency bands may all be used basically.

In the embodiment of the present disclosure, counting clocks of the first clock counter in the CPE and the second clock counter in the CO are synchronized with a network reference clock. The second clock counter is updated at a fixed time by the CO according to a network time reference signal of the network reference clock.

Figure 7:
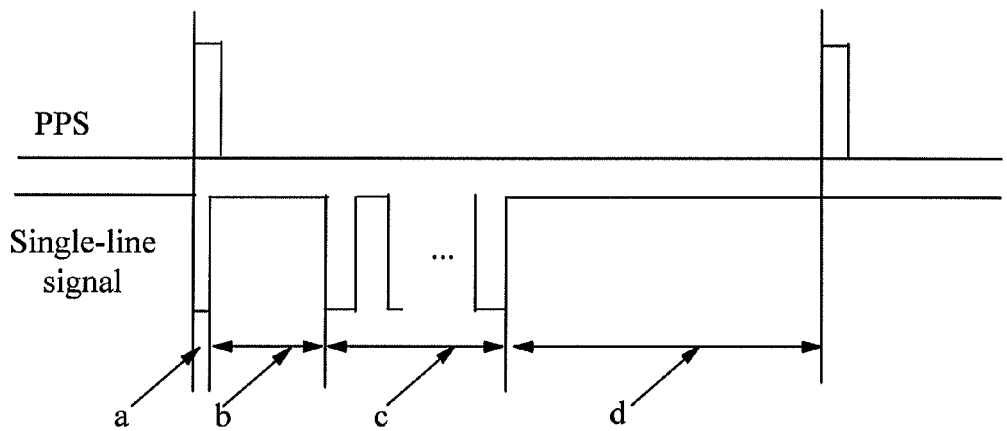
FIG. 7 is a schematic diagram of an embodiment of a network time reference signal according to the present disclosure.

FIG. 7 is a schematic diagram of an embodiment of a network time reference signal according to the present disclosure, and illustrates a definition manner of the network time reference signal. As shown in FIG. 7, a single-line signal is mainly formed by four segments: a segment, b segment, c segment and d segment, where a segment is a packets per second (Packets per Second, PPS) segment, b segment is a waiting segment, c segment is a serial-port information segment, and d segment is an idle segment. A baud rate of a serial port is X, start and stop of the serial port each occupy a bit, and there is no parity bit.

In the embodiment of the present disclosure, the network time reference signal is a serial signal, that is, PPS+time information (Time of Day, TOD). That is, the serial signal includes a pulse per second signal PPS and time information TOD corresponding to the pulse per second signal. In the embodiment of the present disclosure, through serial/parallel conversion, a serial signal (PPS+TOD) may be converted into parallel time information TOD and a pure pulse per second signal PPS, and the parallel signal are provided to the second clock counter. When the pulse per second signal PPS arrives, the second clock counter is updated at a fixed time according to the time information TOD corresponding to the pulse per second signal PPS, so that the second clock counter is synchronized with the network reference clock, so as to provide a high-precision time stamp source.

The above content mainly describes a method for implementing that the CPE adjusts a clock of the CPE according to the corrected first time stamp, the corrected second time stamp, the corrected third time stamp and the corrected fourth time stamp, so that the clock of the CPE is synchronized with a clock of the CO. Definitely, the embodiments of the present disclosure are not limited thereto. In a premise of meeting the precision of the clock synchronization, the CPE may also directly adjust the clock of the CPE according to the first time stamp, the second time stamp, the third time stamp and the fourth time stamp, so that the clock of the CPE is synchronized with the clock of the CO. At this time, if the downlink line delay $\Delta t3$ is equal to the uplink line delay $\Delta t6$, a first clock offset Offset' between the CPE and the CO may be shown in equation (9):

$$\text{Offset'}=((Ts2'+Ts1'')-(Tm2''+Tm1'))/2 \qquad (9).$$

The embodiment of the present disclosure provides a clock synchronization method, which implements high-precision clock synchronization, and meets the high-precision requirement of an XDSL system on the clock synchronization.

Persons skilled in the art should understand that all or a part of the steps of the method according to the embodiments of the present disclosure may be implemented by a program instructing relevant hardware. The program may be stored in a computer readable storage medium. When the program is run, the steps of the method according to the embodiments of the present disclosure are performed. The storage medium may be any medium that is capable of storing program codes, such as a ROM, a RAM, a magnetic disk, or an optical disk.

Figure 8:
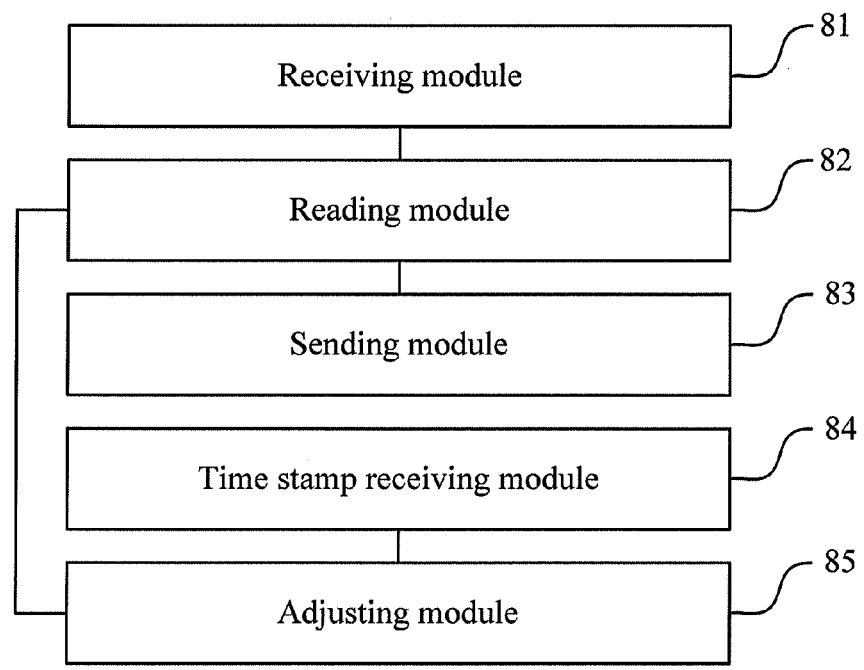
FIG. 8 is a schematic structural diagram of an embodiment of customer premises equipment according to the present disclosure.

FIG. 8 is a schematic structural diagram of an embodiment of customer premises equipment according to the present disclosure, and the customer premises equipment in this embodiment may implement the process of the embodiment shown in FIG. 1. As shown in FIG. 8, the customer premises equipment may include: a receiving module 81, a reading module 82, a sending module 83, a time stamp receiving module 84 and an adjusting module 85.

The receiving module 81 is configured to receive a first DMT signal sent by central office equipment.

The reading module 82 is configured to read a first time stamp when the receiving module 81 receives a first specific position of the first DMT signal.

The sending module 83 is configured to send a second DMT signal.

The reading module 82 is further configured to read a second time stamp when the sending module 83 sends a second specific position of the second DMT signal.

The time stamp receiving module 84 is configured to receive a third time stamp and a fourth time stamp that are sent by the central office equipment through a data information channel, where the third time stamp is read when the central office equipment sends the first specific position of the first DMT signal, and the fourth time stamp is read when the central office equipment receives the second specific position of the second DMT signal.

The adjusting module 85 is configured to determine a clock offset between the customer premises equipment and the central office equipment according to the first time stamp, the second time stamp, the third time stamp and the fourth time stamp, and adjust a clock of the customer premises equipment according to the clock offset, so that the clock of the customer premises equipment is synchronized with a clock of the central office equipment.

In the customer premises equipment, the reading module 82 reads the first time stamp when the receiving module 81 receives the first specific position of the first DMT signal sent by the central office equipment, and reads the second time stamp when the sending module 83 sends the second specific position of the second DMT signal. In addition, the time stamp receiving module 84 may receive the third time stamp and the fourth time stamp that are sent by the central office equipment through the data information channel, where the third time stamp is read when the central office equipment sends the first specific position of the first DMT signal, and the fourth time stamp is read when the central office equipment receives the second specific position of the second DMT signal. Finally, the adjusting module 85 may determine the clock offset between the customer premises equipment and the central office equipment according to the first time stamp, the second time stamp, the third time stamp and the fourth time stamp, and adjust the clock of the customer premises equipment according to the clock offset, so that the clock of the customer premises equipment is synchronized with the clock of the central office equipment. This embodiment improves the precision of clock synchronization and meets the high-precision requirement of an XDSL system on the clock synchronization.

Figure 9:
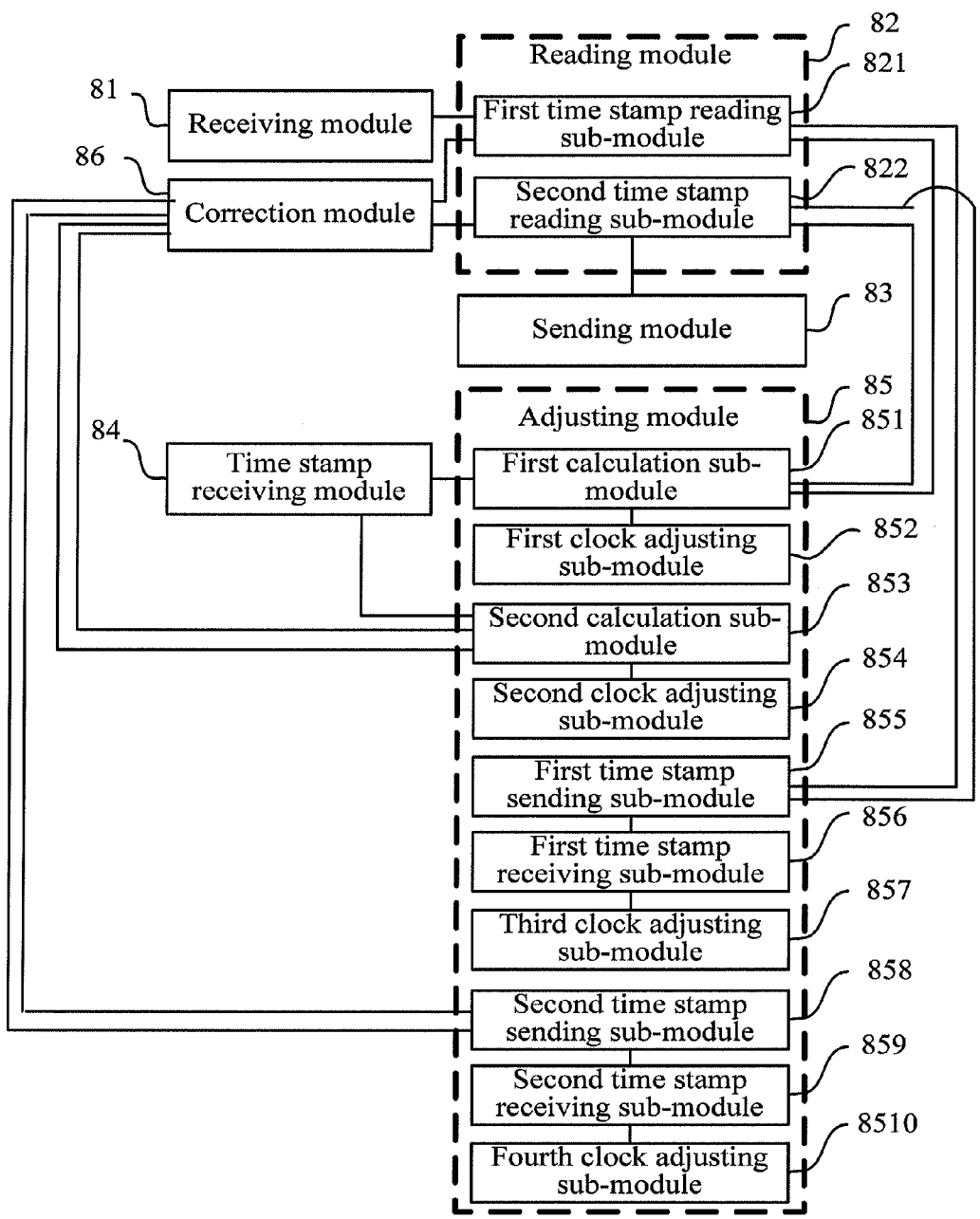
FIG. 9 is a schematic structural diagram of another embodiment of customer premises equipment according to the present disclosure.

FIG. 9 is a schematic structural diagram of another embodiment of customer premises equipment according to the present disclosure. Compared with the customer premises equipment shown in FIG. 8, the difference lies in that, the customer premises equipment shown in FIG. 9 may further include a correction module 86.

The correction module 86 is configured to correct the first time stamp by eliminating a first symbol synchronization offset, a first analog receiving circuit delay of the customer premises equipment and a first digital receiving circuit delay of the customer premises equipment from the first time stamp, which are read by the reading module 82, to obtain a corrected first time stamp; and is further configured to correct the second time stamp by eliminating a second analog sending circuit delay and a second digital sending circuit delay of the customer premises equipment from the second time stamp, which are read by the reading module 82, to obtain a corrected second time stamp.

In this embodiment, the third time stamp received by the time stamp receiving module 84 is a corrected third time stamp obtained after the central office equipment corrects the third time stamp by eliminating a first analog sending circuit delay and a first digital sending circuit delay of the central office equipment from the third time stamp that is read when the central office equipment sends the first specific position of the first DMT signal. The fourth time stamp received by the time stamp receiving module 84 is a corrected fourth time stamp obtained after the central office equipment corrects the fourth time stamp by eliminating a second symbol synchronization offset, a second analog receiving circuit delay of the central office equipment and a second digital receiving circuit delay of the central office equipment from the fourth time stamp that is read when the central office equipment receives the second specific position of the second DMT signal.

In this embodiment, the adjusting module 85 may determine a clock offset between the customer premises equipment and the central office equipment according to the corrected first time stamp, the corrected second time stamp, the corrected third time stamp and the corrected fourth time stamp, and adjust the clock of the customer premises equipment according to the clock offset.

Specifically, the reading module 82 may include a first time stamp reading sub-module 821 and a second time stamp reading sub-module 822.

The first time stamp reading sub-module 821 is configured to read a first clock counter of the customer premises equipment when receiving the first specific position of the first DMT signal to obtain a first time stamp.

The second time stamp reading sub-module 822 is configured to read the first clock counter when the sending module 83 sends the second specific position of the second DMT signal to obtain a second time stamp.

In this embodiment, the third time stamp received by the time stamp receiving module 84 is obtained by reading the second clock counter of the central office equipment when the central office equipment sends the first specific position of the first DMT signal; and the fourth time stamp received by the time stamp receiving module 84 is obtained by reading the second clock counter when the central office equipment receives the second specific position of the second DMT signal.

In this embodiment, counting clocks of the first clock counter and the second clock counter are synchronized with a network reference clock. The second clock counter is updated at a fixed time by the central office equipment according to a network time reference signal of the network reference clock. Specifically, the network time reference signal is a serial signal. The second clock counter may be updated at a fixed time by the central office equipment according to time information in a parallel signal, where the parallel signal is converted from the serial signal and includes the time information and a pulse per second signal corresponding to the time information.

In an implementation manner of this embodiment, the adjusting module 85 may include a first calculation sub-module 851 and a first clock adjusting sub-module 852.

The first calculation sub-module 851 is configured to calculate a first clock offset between the customer premises equipment and the central office equipment according to the first time stamp, the second time stamp, the third time stamp and the fourth time stamp.

The first clock adjusting sub-module 852 is configured to adjust a counting clock of a second clock counter of the customer premises equipment according to the first clock offset calculated by the first calculation sub-module 851.

In another implementation manner of this embodiment, the adjusting module 85 may include a second calculation sub-module 853 and a second clock adjusting sub-module 854.

The second calculation sub-module 853 is configured to calculate a second clock offset between the customer premises equipment and the central office equipment according to the corrected first time stamp, the corrected second time stamp, the corrected third time stamp and the corrected fourth time stamp.

The second clock adjusting sub-module 854 is configured to adjust a counting clock of a second clock counter of the customer premises equipment according to the second clock offset calculated by the second calculation sub-module 853.

In still another implementation manner of this embodiment, the adjusting module 85 may include: a first time stamp sending sub-module 855, a first time stamp receiving sub-module 856 and a third clock adjusting sub-module 857.

The first time stamp sending sub-module 855 is configured to send the first time stamp and the second time stamp to the central office equipment through a data information channel.

The first time stamp receiving sub-module 856 is configured to receive a first clock offset that is between the customer premises equipment and the central office equipment and is sent by the central office equipment through a message channel, where the first clock offset is calculated by the central office equipment according to the first time stamp, the second time stamp, the third time stamp and the fourth time stamp.

The third clock adjusting sub-module 857 is configured to adjust a counting clock of a second clock counter of the customer premises equipment according to the first clock offset received by the first time stamp receiving sub-module 856.

In still another implementation manner of this embodiment, the adjusting module 85 may include: a second time stamp sending sub-module 858, a second time stamp receiving sub-module 859 and a fourth clock adjusting sub-module 8510.

The second time stamp sending sub-module 858 is configured to send the corrected first time stamp and the corrected second time stamp to the central office equipment through a data information channel.

The second time stamp receiving sub-module 859 is configured to receive a second clock offset that is between the customer premises equipment and the central office equipment and is sent by the central office equipment through a message channel, where the second clock offset is calculated by the central office equipment according to the corrected first time stamp, the corrected second time stamp, the corrected third time stamp and the corrected fourth time stamp.

The fourth clock adjusting sub-module 8510 is configured to adjust a counting clock of a second clock counter of the customer premises equipment according to the second clock offset received by the second time stamp receiving sub-module 859.

The customer premises equipment improves the precision of clock synchronization and meets the high-precision requirement of an XDSL system on the clock synchronization.

Figure 10:
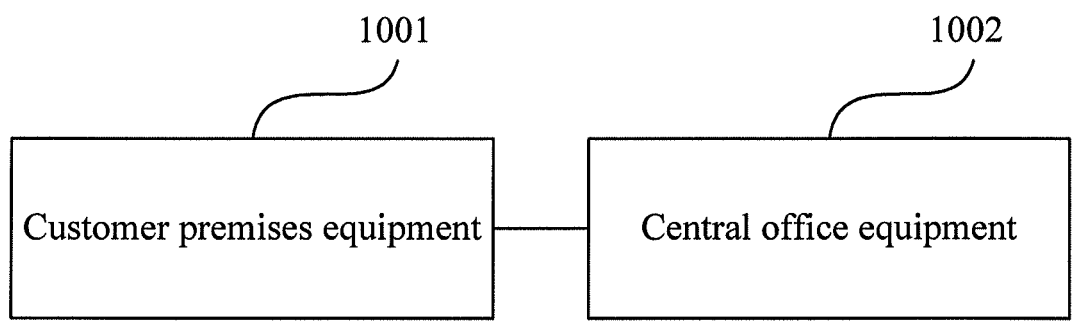
FIG. 10 is a schematic structural diagram of an embodiment of a clock synchronization system according to the present disclosure.

FIG. 10 is a schematic structural diagram of an embodiment of a clock synchronization system according to the present disclosure. As shown in FIG. 10, the clock synchronization system may include: customer premises equipment 1001 and central office equipment 1002.

The customer premises equipment 1001 is configured to read a first time stamp when receiving a first specific position of a first DMT signal sent by the central office equipment 1002; read a second time stamp when sending a second specific position of a second DMT signal; receive a third time stamp and a fourth time stamp that are sent by the central office equipment 1002 through a data information channel; determine a clock offset between the customer premises equipment and the central office equipment according to the first time stamp, the second time stamp, the third time stamp and the fourth time stamp, and adjust a clock of the customer premises equipment 1001 according to the clock offset, so that the clock of the customer premises equipment 1001 is synchronized with a clock of the central office equipment 1002.

The third time stamp is read when the central office equipment 1002 sends the first specific position of the first DMT signal, and the fourth time stamp is read when the central office equipment 1002 receives the second specific position of the second DMT signal.

Specifically, the customer premises equipment 1001 may be implemented through the customer premises equipment shown in FIG. 8 and FIG. 9 in the present disclosure.

In the above clock synchronization system, the customer premises equipment 1001 reads the first time stamp when receiving the first specific position of the first DMT signal sent by the central office equipment 1002, and reads the second time stamp when sending the second specific position of the second DMT signal. In addition, the customer premises equipment 1001 may receive the third time stamp and the fourth time stamp that are sent by the central office equipment 1002 through the data information channel, where the third time stamp is read when the central office equipment 1002 sends the first specific position of the first DMT signal, and the fourth time stamp is read when the central office equipment 1002 receives the second specific position of the second DMT signal. Finally, the customer premises equipment 1001 may determine the clock offset between the customer premises equipment 1001 and the central office equipment 1002 according to the first time stamp, the second time stamp, the third time stamp and the fourth time stamp, and adjust the clock of the customer premises equipment 1001 according to the clock offset, so that the clock of the customer premises equipment 1001 is synchronized with the clock of the central office equipment 1002. The clock synchronization system improves the precision of clock synchronization and meets the high-precision requirement of an XDSL system on the clock synchronization.

Figure 11:
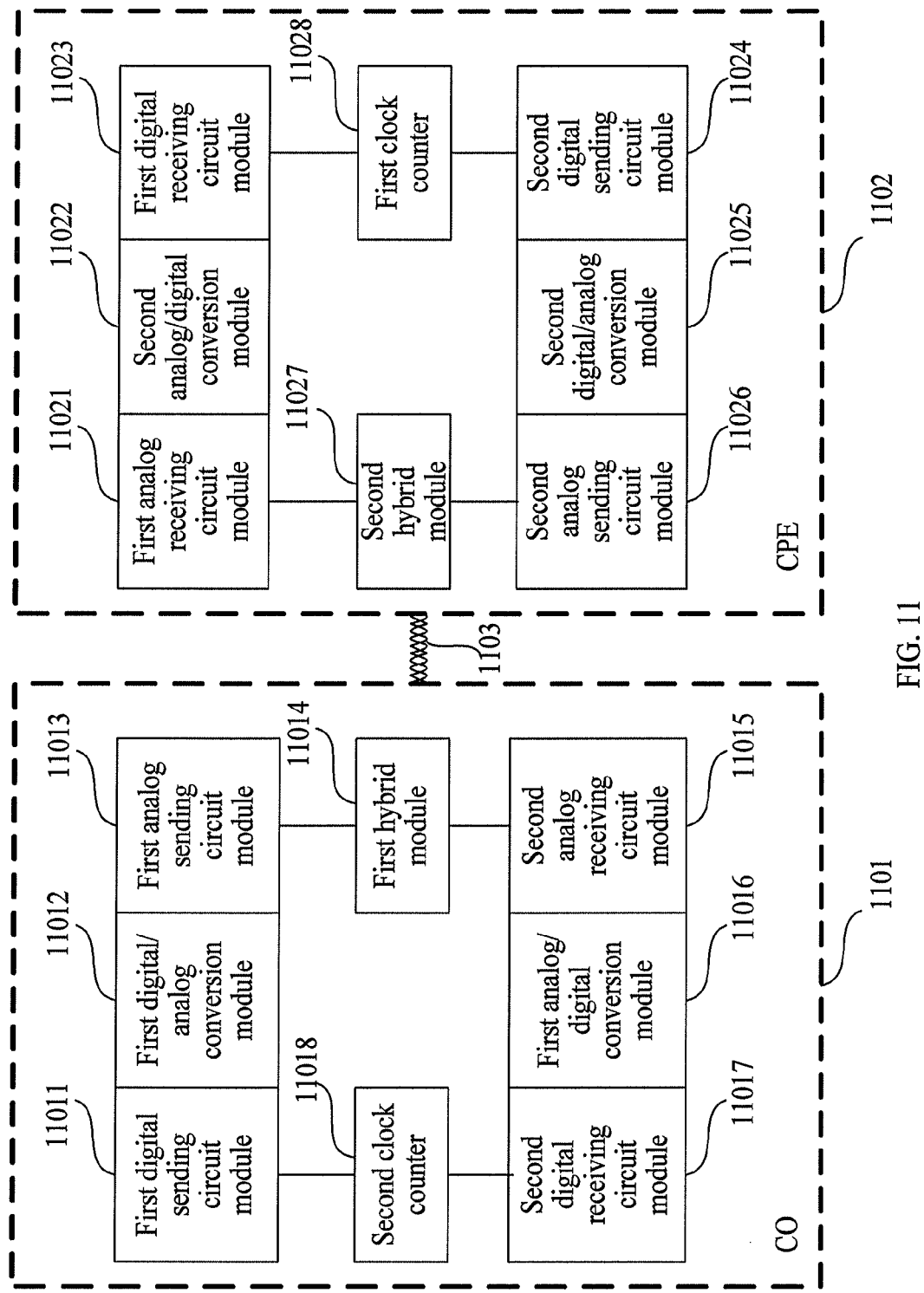
FIG. 11 is a schematic structural diagram of another embodiment of a clock synchronization system according to the present disclosure.

FIG. 11 is a schematic structural diagram of another embodiment of a clock synchronization system according to the present disclosure, and the clock synchronization system shown in FIG. 11 is a specific implementation manner of the clock synchronization system shown in FIG. 10. As shown in FIG. 11, the clock synchronization system may include a CO 1101, CPE 1102 and a cable 1103.

The CO 1101 may include a first digital sending circuit module 11011, a first digital/analog conversion module 11012, a first analog sending circuit module 11013, a first hybrid (Hybrid) module 11014, a second analog receiving circuit module 11015, a first analog/digital conversion module 11016, a second digital receiving circuit module 11017 and a second clock counter 11018.

The CPE 1102 may include a first analog receiving circuit module 11021, a second analog/digital conversion module 11022, a first digital receiving circuit module 11023, a second digital sending circuit module 11024, a second digital/analog conversion module 11025, a second analog sending circuit module 11026, a second hybrid module 11027 and a first clock counter 11028.

The clock synchronization system provided by this embodiment may implement the clock synchronization method provided by the embodiment of the present disclosure.

In this embodiment, a first clock counter 11028 and a second clock counter 11018 are synchronized with a network reference clock.

In the embodiment of the present disclosure, the second clock counter 11018 is updated at a fixed time by the CO 1101 according to a network time reference signal of the network reference clock. Specifically, at a moment of an integral second of the network reference clock, the PPS signal may have a pulse, and at this time, the CO 1101 may set the moment when the PPS signal has the pulse per second in the TOD signal corresponding to the PPS signal into the second clock counter 11018 of the CO 1101, so that the second clock counter 11018 is synchronized with the network reference clock.

At the CPE 1102 side, after obtaining the clock offset between the CO 1101 and the CPE 1102 each time, the CPE 1102 adjusts the first clock counter 11028 of the CPE 1102 once according to the obtained clock offset. If the obtained clock offset is 1 second, it indicates that the first clock counter 11028 of the CPE 1102 is 1 second quicker than the second clock counter 11018 of the CO 1101, and at this time, the CPE 1102 sets the first clock counter 11028 1 second backwards.

The clock synchronization system improves the precision of clock synchronization and meets the high-precision requirement of an XDSL system on the clock synchronization.

It should be understood by persons skilled in the art that the accompanying drawings are merely schematic diagrams of an exemplary embodiment, and modules or processes in the accompanying drawings are not necessarily required in implementing the present disclosure.

It should be understood by persons skilled in the art that, modules in a device according to an embodiment may be distributed in the device of the embodiment according to the description of the embodiment, or be correspondingly changed to be disposed in one or more devices different from this embodiment. The modules of the above embodiment may be combined into one module, or may be further divided into a plurality of sub-modules.

The embodiments of the present disclosure are described here through specific examples. The description about the embodiments of the present disclosure is merely provided for ease of understanding of the present disclosure. Persons skilled in the art should understand that they may make modifications or replacements to the present disclosure in terms of the solutions according to the embodiments of the present disclosure, and these modifications and replacements do not make corresponding solutions fall apart from the idea and protection scope of the present disclosure.

What is claimed is:

1. A clock synchronization method, comprising:
   reading, by a customer premises equipment, a first time stamp when receiving a first specific position of a first discrete multi-tone (DMT) signal sent by a central office equipment; and reading a second time stamp when sending a second specific position of a second DMT signal;
   correcting, by the customer premises equipment, the first time stamp by eliminating a first symbol synchronization offset, a first analog receiving circuit delay of the customer premises equipment and a first digital receiving circuit delay of the customer premises equipment from the first time stamp;
   correcting, by the customer premises equipment, the second time stamp by eliminating a second analog sending circuit delay and a second digital sending circuit delay of the customer premises equipment from the second time stamp;
   receiving, by the customer premises equipment, a corrected third time stamp and a corrected fourth time stamp that are sent by the central office equipment through a data information channel; wherein the corrected third time stamp is obtained after the central office equipment corrects a third time stamp by eliminating a first analog sending circuit delay and a first digital sending circuit delay of the central office equipment from the third time stamp; the corrected fourth time stamp is obtained after the central office equipment corrects a fourth time stamp by eliminating a second symbol synchronization offset, a second analog receiving circuit delay of the central office equipment and a second digital receiving circuit delay of the central office equipment; wherein the third time stamp is read when the central office equipment sends the first specific position of the first DMT signal, and the fourth time stamp is read when the central office equipment receives the second specific position of the second DMT signal; and
   determining, by the customer premises equipment, a clock offset between the customer premises equipment and the central office equipment according to the corrected first time stamp, the corrected second time stamp, the corrected third time stamp, and the corrected fourth time stamp, and adjusting a clock of the customer premises equipment according to the clock offset.

2. The method according to claim 1, wherein reading, by the customer premises equipment, the first time stamp when receiving the first specific position of the first discrete multi-tone (DMT) signal sent by the central office equipment comprises:
   reading, by the customer premises equipment, a first clock counter of the customer premises equipment when receiving the first specific position of the first DMT signal, and obtaining the first time stamp; and
   reading the second time stamp when sending the second specific position of the second DMT signal comprises:
   reading, by the customer premises equipment, the first clock counter when sending the second specific position of the second DMT signal, and obtaining the second time stamp, wherein
   the third time stamp is obtained by the central office equipment through reading a second clock counter of the central office equipment when the central office equipment sends the first specific position of the first DMT signal; and
   the fourth time stamp is obtained by the central office equipment through reading the second clock counter when the central office equipment receives the second specific position of the second DMT signal.

3. The method according to claim 2, wherein counting clocks of the first clock counter and the second clock counter are synchronized with a network reference clock; and
   the second clock counter is updated at a fixed time by the central office equipment according to a network time reference signal of the network reference clock.

4. The method according to claim 3, wherein the network time reference signal comprises a serial signal;
   updating, by the central office equipment, the second clock counter at a fixed time according to the network time reference signal of the network reference clock comprises:
   updating, by the central office equipment, the second clock counter at the fixed time according to time information in a parallel signal, wherein the parallel signal is converted from the serial signal and comprises the time information and a pulse per second signal corresponding to the time information.

5. The method according to claim 1, wherein determining, by the customer premises equipment, the clock offset between the customer premises equipment and the central office equipment according to the corrected first time stamp, the corrected second time stamp, the corrected third time stamp and the corrected fourth time stamp, and adjusting the clock of the customer premises equipment according to the clock offset comprises:
   calculating, by the customer premises equipment, the clock offset between the customer premises equipment and the central office equipment according to the corrected first time stamp, the corrected second time stamp, the corrected third time stamp and the corrected fourth time stamp, and adjusting a counting clock of the customer premises equipment according to the clock offset.

6. The method according to claim 1, wherein determining, by the customer premises equipment, the clock offset between the customer premises equipment and the central office equipment according to the corrected first time stamp, the corrected second time stamp, the corrected third time stamp and the corrected fourth time stamp, and adjusting the clock of the customer premises equipment according to the clock offset comprises:

calculating, by the customer premises equipment, the clock offset between the customer premises equipment and the central office equipment according to the corrected first time stamp, the corrected second time stamp, the corrected third time stamp and the corrected fourth time stamp, and adjusting a counting clock of the customer premises equipment according to the clock offset.

7. The method according to claim 1, wherein determining, by the customer premises equipment, the clock offset between the customer premises equipment and the central office equipment according to the first time stamp, the second time stamp, the third time stamp and the fourth time stamp, and adjusting the clock of the customer premises equipment according to the clock offset comprises:

sending, by the customer premises equipment, the first time stamp and the second time stamp to the central office equipment through the data information channel, and receiving a clock offset that is between the customer premises equipment and the central office equipment and is sent by the central office equipment through a message channel, wherein the clock offset is calculated by the central office equipment according to the first time stamp, the second time stamp, the third time stamp and the fourth time stamp; and adjusting, by the customer premises equipment, a counting clock of the customer premises equipment according to the clock offset.

8. The method according to claim 1, wherein determining, by the customer premises equipment, the clock offset between the customer premises equipment and the central office equipment according to the corrected first time stamp, the corrected second time stamp, the corrected third time stamp and the corrected fourth time stamp, and adjusting the clock of the customer premises equipment according to the clock offset comprises:

sending, by the customer premises equipment, the corrected first time stamp and the corrected second time stamp to the central office equipment through the data information channel, and receiving the clock offset that is between the customer premises equipment and the central office equipment and is sent by the central office equipment through the message channel, wherein the clock offset is calculated by the central office equipment according to the corrected first time stamp, the corrected second time stamp, the corrected third time stamp and the corrected fourth time stamp; and adjusting, by the customer premises equipment, a counting clock of the customer premises equipment according to the clock offset.

9. A customer premises equipment, comprising:
a receiving circuit module, configured to receive a first discrete multi-tone (DMT) signal sent by central office equipment;
a reading module, configured to read a first time stamp when the receiving circuit module receives a first specific position of the first DMT signal;
a sending circuit module, configured to send a second DMT signal,
wherein the reading module is further configured to read a second time stamp when the sending circuit module sends a second specific position of the second DMT signal;

a time stamp receiving module, configured to receive a corrected third time stamp and a corrected fourth time stamp that are sent by the central office equipment through a data information channel; wherein the corrected third time stamp is obtained after the central office equipment corrects a third time stamp by eliminating a first analog sending circuit delay and a first digital sending circuit delay of the central office equipment from the third time stamp; the corrected fourth time stamp is obtained after the central office equipment corrects a fourth time stamp by eliminating a second symbol synchronization offset, a second analog receiving circuit delay of the central office equipment and a second digital receiving circuit delay of the central office equipment; wherein the third time stamp is read when the central office equipment sends the first specific position of the first DMT signal, and the fourth time stamp is read when the central office equipment receives the second specific position of the second DMT signal;

a correction module, configured to correct the first time stamp by eliminating a first symbol synchronization offset, a first analog receiving circuit delay of the customer premises equipment and a first digital receiving circuit delay of the customer premises equipment from the first time stamp that is read by the reading module, to obtain a corrected first time stamp; and correct the second time stamp by eliminating a second analog sending circuit delay and a second digital sending circuit delay of the customer premises equipment from the second time stamp that is read by the reading module, to obtain a corrected second time stamp, and an adjusting module, configured to determine a clock offset between the customer premises equipment and the central office equipment according to the corrected first time stamp, the corrected second time stamp, the corrected third time stamp and the corrected fourth time stamp, and adjust a clock of the customer premises equipment according to the clock offset, so that the clock of the customer premises equipment is synchronized with a clock of the central office equipment.

10. The customer premises equipment according to claim 9, wherein the reading module comprises:
a first time stamp reading sub-module, configured to read a first clock counter of the customer premises equipment when the receiving circuit module receives the first specific position of the first DMT signal, to obtain the first time stamp; and
a second time stamp reading sub-module, configured to read the first clock counter when the sending circuit module sends the second specific position of the second DMT signal, to obtain the second time stamp, wherein the third time stamp received by the time stamp receiving module is obtained by the central office equipment through reading a second clock counter of the central office equipment when the central office equipment sends the first specific position of the first DMT signal; and the fourth time stamp received by the time stamp receiving module is obtained by the central office equipment through reading the second clock counter when the central office equipment receives the second specific position of the second DMT signal.

11. The customer premises equipment according to claim 9, wherein the adjusting module comprises:
a calculation sub-module, configured to calculate a clock offset between the customer premises equipment and the central office equipment according to the corrected first time stamp, the corrected second time stamp, the corrected third time stamp and the corrected fourth time stamp; and a clock adjusting sub-module, configured to adjust a counting clock of the customer premises equipment according to the clock offset calculated by the calculation sub-module.

12. The customer premises equipment according to claim 9, wherein the adjusting module comprises:

a first time stamp sending sub-module, configured to send the first time stamp and the second time stamp to the central office equipment through the data information channel;

a first time stamp receiving sub-module, configured to receive a clock offset that is between the customer premises equipment and the central office equipment and is sent by the central office equipment through the message channel, wherein the clock offset is calculated by the central office equipment according to the first time stamp, the second time stamp, the third time stamp and the fourth time stamp; and a clock adjusting sub-module, configured to adjust a counting clock of the customer premises equipment according to the clock offset received by the first time stamp receiving sub-module.

13. The customer premises equipment according to claim 9, wherein the adjusting module comprises:

a time stamp sending sub-module, configured to send the corrected first time stamp and the corrected second time stamp to the central office equipment through the data information channel;

a time stamp receiving sub-module, configured to receive a clock offset that is between the customer premises equipment and the central office equipment and is sent by the central office equipment through the message channel, wherein the clock offset is calculated by the central office equipment according to the corrected first time stamp, the corrected second time stamp, the corrected third time stamp and the corrected fourth time stamp; and a clock adjusting sub-module, configured to adjust a counting of the customer premises equipment according to the clock offset received by the time stamp receiving sub-module.

14. A clock synchronization system, comprising: the customer premises equipment of claim 9 and a central office equipment.

* * * * *